United States Patent [19]

Parienti

[11] Patent Number: 4,776,000
[45] Date of Patent: Oct. 4, 1988

[54] TELEPHONE COMMUNICATIONS SYSTEM WITH PORTABLE HANDSETS

[76] Inventor: Raoul Parienti, 5, Rue de Belgique, 06000 Nice, France

[21] Appl. No.: 7,613

[22] Filed: Jan. 28, 1987

[30] Foreign Application Priority Data

Jan. 28, 1986 [FR] France .................. 86 01277

[51] Int. Cl.⁴ .............................. H04Q 7/04
[52] U.S. Cl. ........................ 379/62; 379/91; 379/144; 379/56
[58] Field of Search ............ 379/91, 144, 61, 63, 379/62, 56; 235/379, 380

[56] References Cited

U.S. PATENT DOCUMENTS

| | | | |
|---|---|---|---|
| 4,275,385 | 6/1981 | White | 340/312 |
| 4,439,636 | 3/1984 | Neukirk et al. | 379/144 |
| 4,456,793 | 6/1984 | Baker et al. | 379/61 |
| 4,523,087 | 6/1985 | Benton | 235/379 |
| 4,587,379 | 5/1986 | Masuda | 379/91 |
| 4,640,986 | 2/1987 | Yotsutani et al. | 379/60 |
| 4,650,981 | 3/1987 | Foletta | 235/449 |

Primary Examiner—Robert Lev
Attorney, Agent, or Firm—Schweitzer & Cornman

[57] ABSTRACT

This is a telephone communications system having at least one fixed terminal connected by at least one subscriber's line to a telephone exchange and a plurality of portable handsets, the fixed terminal and the portable handsets having infrared transmitters and receivers for exchanging unit charging information and sound data information, the fixed terminal transmitting to a given handset unit charging signals received from the telephone exchange during a call, each portable handset accommodating a support for a programmable read-only memory and logic circuit for deducting from the programmable read-only memory unit charges corresponding to the unit charging signals transmitted by the terminal, each portable handset further transmitting a pay signal to the fixed terminal after having deducted the unit charge fee from the programmable read-only memory, and the fixed terminal further arranged for cutting off the call in case of failure to receive a pay signal after having transmitted a unit charging signal, interference between portable units being avoided by the use of time multiplexed bursts of pulses.

5 Claims, 5 Drawing Sheets

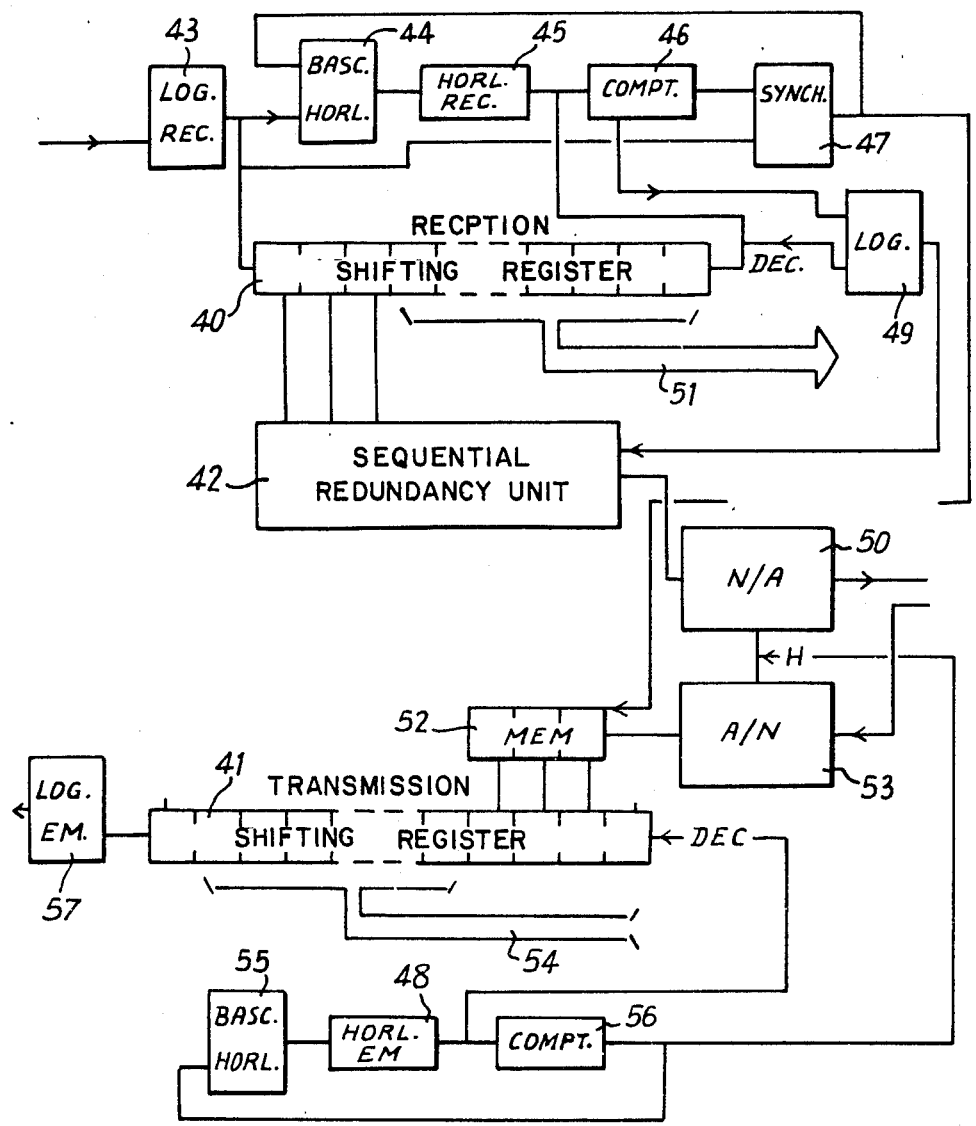

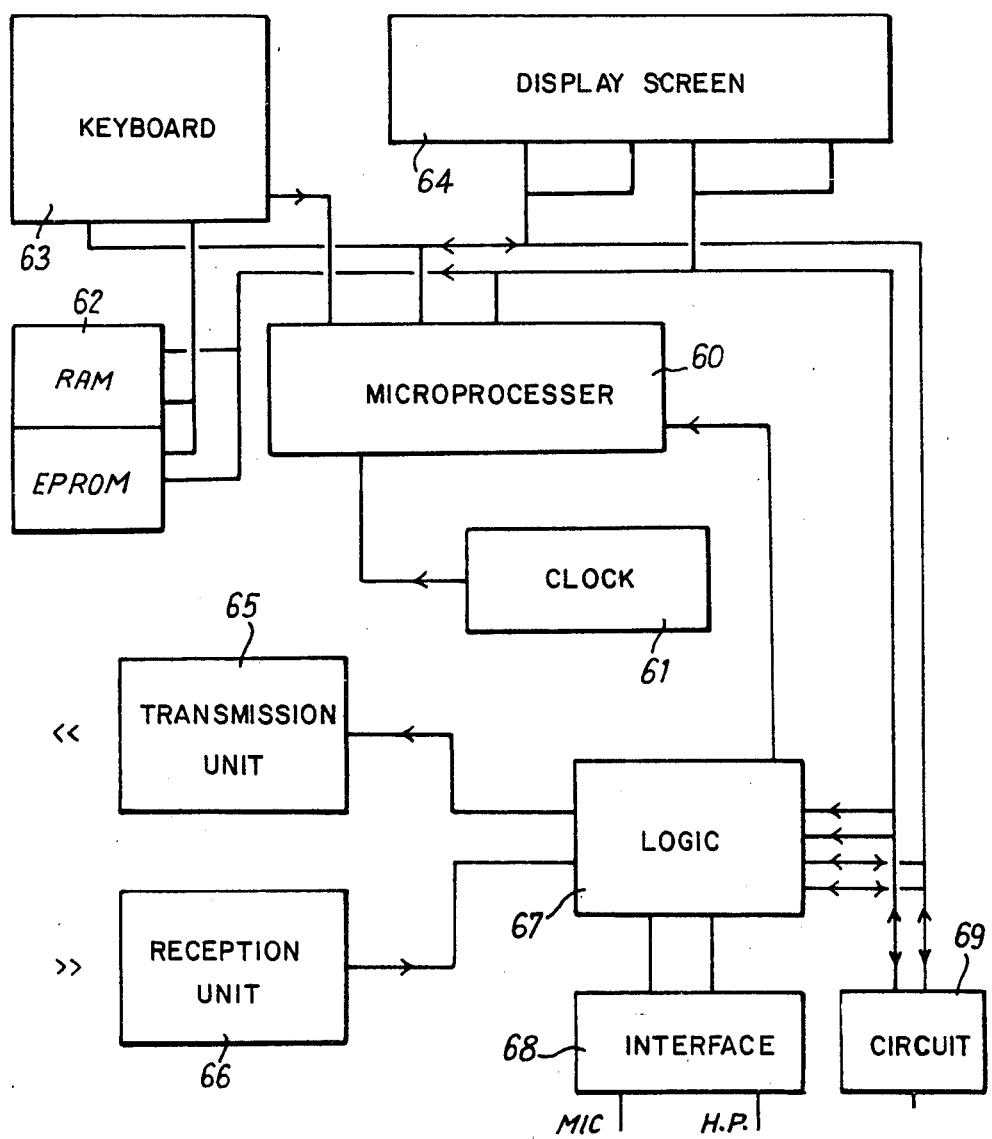
Fig:5

TELEPHONE COMMUNICATIONS SYSTEM WITH PORTABLE HANDSETS

BACKGROUND OF THE INVENTION

This invention concerns a telephone communications system comprising at least one fixed terminal connected by a subscriber's line to a telephone exchange and a multiplicity of portable handsets, the fixed terminal and the portable handsets being equipped with means of transmission by infrared radiation for exchanging at least the charging information and the sound data information.

Such a communications system is already known from European Patent Application No. 0115240. The system described in that document enables each user possessing a portable handset to access the telephone network by means of a fixed terminal placed in a telephone booth. It presents the disadvantage, however, of providing for a centralized management of charges with issuance of invoices to the different users. The latter must therefore each hold a subscription, on account of which the telephone charges are debited.

SUMMARY OF THE PRESENT INVENTION

This invention is aimed at overcoming that problem by rendering portable handsets totally autonomous through a decentralized management of charges.

For that purpose, the invention concerns a telephone communications system comprising at least one fixed terminal connected by a subscriber's line to a telephone exchange and a multiplicity of portable handsets, the fixed terminal and the portable handsets being equipped with means of transmission by infrared radiation for exchanging at least the charging information and the sound data information, characterized in that the fixed terminal is equipped with means for transmitting to a given handset charging signals that it receives from the telephone exchange as the call is made, each portable handset is equipped with means of reception for a programmable read-only storage medium of "memory card" type, and said portable handset is set up to deduct from that pogrammable read-only memory unit charging corresponding to the charging signals transmitted by the fixed terminal.

Since a memory card can be prepaid, the user is, consequently, debited as his call is made, on reception of the charging signals, without it being necessary to make any calculation whatever in the fixed terminal or in the portable handset. Furthermore, the telephone exchange to which the fixed terminal is connected does not require any particular adaptation.

The portable handset is preferably set up to transmit a pay signal to the fixed terminal after having deducted said unit charge, the fixed terminal being for its part set up to cut off the call in case of failure to receive the pay signal after transmission of a charging signal.

It is thus possible to avoid any chance of fraud, which might, for example, consist of concealing charging information on its reception by the portable handset. In fact, in that case, the handset would not transmit the pay signal, which would result in cutting off the call.

So as further to limit the possibilites of fraud, the charging information transmitted from the fixed terminal to the portable handset can consist of a random code, the sequence of which can also depend on an identification number of the fixed terminal and/or portable handset. In that case, the portable handset transforms that code by a ciphering algorithm and sends it back to the fixed terminal after having deducted the unit charge from the programmable read-only memory. The fixed terminal deciphers the pay signal by an inverse algorithm and deduces from it the validity of the charge. If that validity is not recognized, the fixed terminal repeats its charging information a number of times, beyond which the call is cut off.

In one particular embodiment of the invention, the fixed terminal is connected to the telephone exchange by a multiplicity of subscriber's lines and it is set up to exchange the said charging and sound data information with a multiplicity of portable handsets by time multiplexing.

In that case, notably, the fixed terminal can be set up in a clear place at a certain height, which, in addition, makes it vandalism-proof.

The fixed terminal and the portable handsets can be arranged to exchange said information in the form of bundles of pulses emitted by infrared diodes controlled by control means placed respectively in the fixed terminal and in each portable handset.

In particular, each bundle of pulses can include pulses corresponding to a multiplicity of samplings preceding its emission, the fixed terminal and the portable handsets containing means of combinational logic for determining, from the pulses of a multiplicity of successive pulse bundles, the information most probably transmitted.

Such an arrangement is particularly important in case the fixed terminal is placed, as previously mentioned, in an unprotected environment. A redundancy of information making it possible to limit transmission errors is, in fact, assured by this means. It is indeed to be noted that an infrared connection in an unprotected environment can be disturbed by ambient brightness variations in the absence of specific measures taken to avoid those disturbances.

In case the fixed terminal makes possible the routing of a multiplicity of calls, as such possibility was mentioned above, it is necessary to assure the confidentiality of each of those calls.

For that purpose, each bundle of pulses can include pulses identifying the portable handset for which it is intended or from which said bundle of pulses originates.

A code is advantageously assigned to each portable handset, the fixed terminal is set up to receive on its line a call containing such a code and to emit a bundle of pulses containing the code received, and the handset is set up to emit a signal in response to the reception of a bundle containing its own code and to be connected with the said line.

One particular embodiment of the invention will now be described, by way of nonlimitative example, with reference to the attached drawings.

DESCRIPTION OF DRAWINGS

FIG. 4 is a diagram of the logical circuit of a channel of that fixed terminal, and FIG. 5 is a block diagram of a portable handset according to the invention.

DETAILED DESCRIPTION OF THE INVENTION

Figure 1:
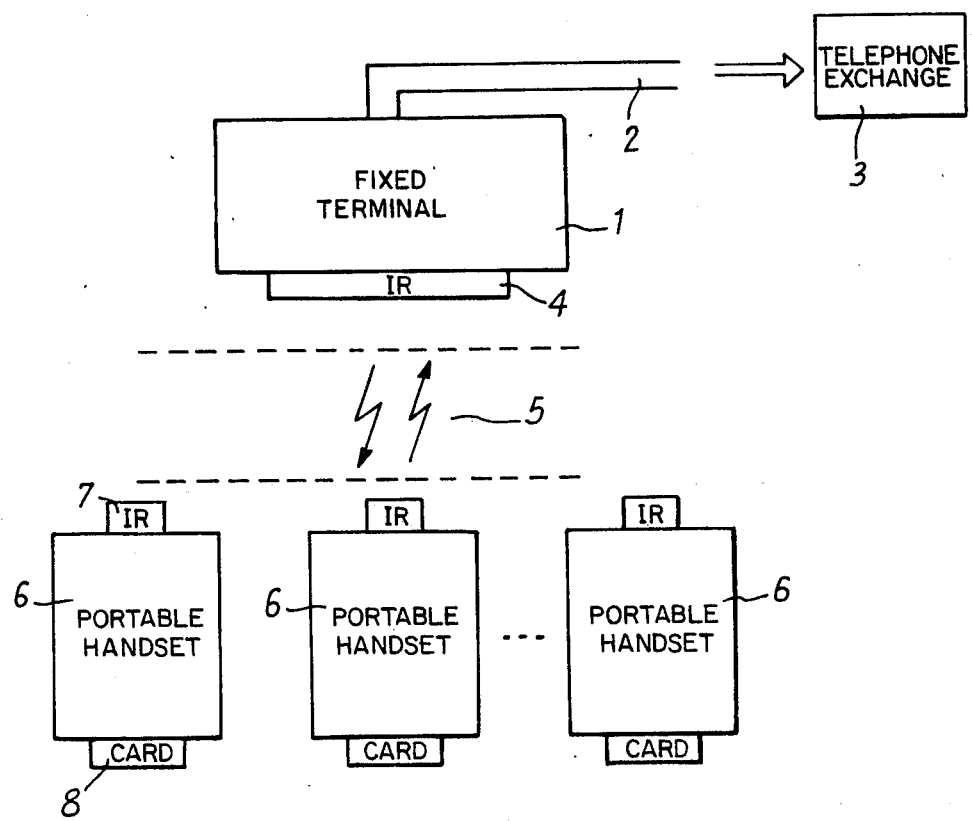
FIG. 1 is a general diagram of the system according to the invention.

A fixed terminal (1) connected by a set of subscriber's telephone lines (2) to a telephone exchange (3) is shown on FIG. 1. The fixed terminal (1) contains as many channels as there are lines (2), each channel acting as a subscriber's station in relation to the exchange (3). A set (4) of infrared photodiodes and photoreceptors makes it possible to establish a connection (5) with as many portable handsets (6) as there are telephone lines (2) joining the exchange (3) to the fixed terminal (1).

For that purpose, each portable handset (6) also contains a set of infrared photodiodes and photoreceptors (7) making it possible to transmit information to the terminal (1) and to receive other information from the latter.

The handset (6), of course, also includes at least one keyboard with dialing and function keys, a microphone and a speaker, as well as preferably a liquid crystal display screen.

Finally, according to the invention, each portable handset (6) includes a housing accommodating a memory card (8) bearing a programmable read-only memory. suitable electric contacts in that housing make it possible to assure the interface between the below-mentioned circuits of the handset (6) and the memory carried by the card (8).

The infrared assemblies (4 and 7) are preferably set up to permit two operating modes, namely, a "wide-angle" mode in which transmission takes place over approximately one-quarter of a sphere and a "narrow-angle" mode in which transmission takes place at an angle, for example, in the order of 40°. It is thus possible to increase the receiving distance by means of a reduction of the angle in which that reception is possible. On the fixed terminal side the passage from one mode to another can take place automatically as a function of the quality of reception of the pulses received from the portable handset.

The connection (5) consists of an exchange between the fixed terminal (1) and the portable handsets (6) of bundles of infrared pulses having a fixed timing structure. That exchange is carried out by time multiplexing; that is, the fixed terminal (1) sends a first bundle of pulses to one of the portable handsets and then receives a bundle of pulses from the latter in response. The fixed terminal thereupon addresses a new bundle of pulses to another handset and so on until the cycle resumes. The duration of the cycle is equal to the period of voice sampling carried out in the fixed terminal for reception and in each handset for transmission.

Each bundle of pulses contains, notably:

an initial synchronizing pulse, the function of which is to hold the possible receiver (fixed terminal or portable handset) so that it can receive and distribute the different following pulses in a battery system;

a system of management pulses indicating the number of the channel used, so as to assure the confidentiality of the connection. In fact, when a portable handset picks up a bundle of pulses, it tests those channel-designating pulses so as to determine if it has to take that transmission into account and answer it. On the other hand, all portable handsets transmit the same channel number. Thus, a portable handset cannot answer another portable handset which should be in the vicinity and whose transmission it should pick up by mistake. In any event, there is no risk of seeing the fixed terminal make a mistake about the origin of a bundle of pulses, because each portable handset can transmit only in response to reception of the end-of-bundle pulse described below, emitted by the terminal;

other management pulses enabling a number of pieces of information, such as dialing information and, in particular, charging information, to be passed inaudibly to the user. In the terminal-handset direction that charging information consists of a code aimed at debiting the memory code as the call is made. In the handset-terminal direction that charging information consists of the pay signal establishing that the memory card has been correctly debited in response to reception of the code transmitted by the terminal;

sound data pulses enabling the receiving to reconstruct the sound, as will be described below;

an end-of-bundle pulse whose function is to start off the free transmission sequence clock of the correspondent if his bundle of pulses is to follow.

To permit installation of the fixed terminal in an unprotected environment, a sequential redundancy procedure is provided for, making it possible to guarantee the reliability of transmission.

For that purpose, the sound data pulses of each bundle of pulses include coded information corresponding not only to the last sampling, but also to the two previous samplings. Every piece of data is then transmitted three times, each of the values transmitted being stored in memory on the receiver side.

A combinational logic makes it possible, with these three stored values, to determine the most probable value, which is then addressed to the conversion system.

Each piece of sound data is then shifted in time by a value equal to three times the sampling period of the converter, but that value remains in an order of magnitude imperceptible to the ear.

Figure 2:
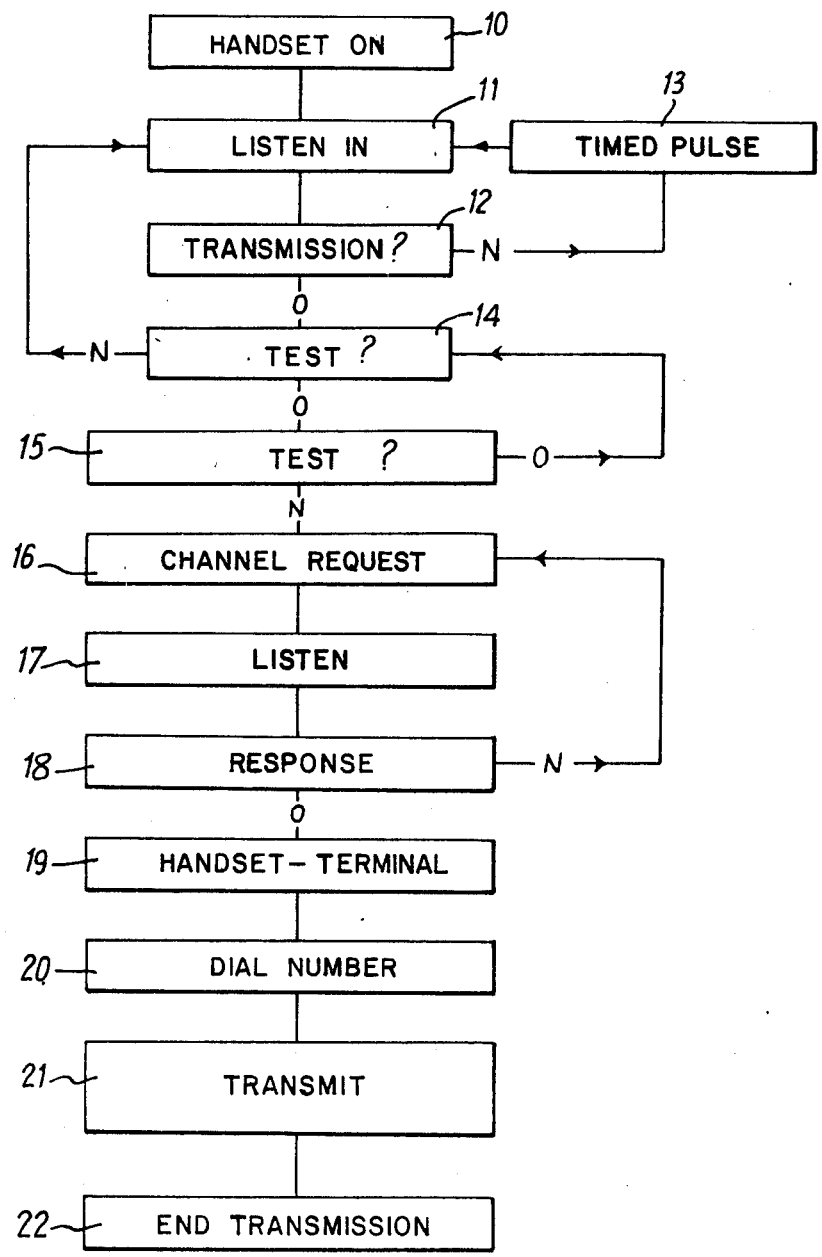
FIG. 2 is a flow chart illustrating the different stages of a connection by means of the system according to the invention.

It will now be described in general, with reference to FIG. 2, how a telephone call takes place between a portable handset (6) and a subscriber's station connected to the network to which the telephone exchange (3) is linked.

The owner of a handset (6) is, first of all, placed at a distance from a fixed terminal (1) making it possible to assure an infrared connection under good conditions. He then places his handset at (10) in active working configuration, for example, by completely opening it, if that handset is folding.

The handset is then listened in at (11) to detect at (12) a possible transmission from the fixed terminal (1). If any transmission is detected, the handset emits at the end of a certain time at (13) some infrared pulses intended to excite the fixed terminal, and then returns to listening position to pick up the expected transmission.

Upon the reception of a first bundle of pulses at (12), the hnadset tests the management pulses of that bundle at (14) in order to make sure that it really comes from the fixed terminal and not from another handset which might be in service nearby.

After reception of the first bundle of pulses from the fixed terminal, the handset is listened in for a period corresponding to the time span between two successive channels of the fixed terminal, in order to determine at (15) if the following channel is occupied. If another bundle of pulses occurs, the handset repeats the same action until perceiving the presence of a "gap" in the sequence of bundles of pulses.

If no gap is detected, all the channels of the fixed terminal are occupied.

If, on the other hand, a gap is detected, the handset emits at (16) a channel request signal, synchronized on the signals of the bundle previously received.

The handset is then listened in at (17) for a period equal to one cycle of the fixed terminal pending the response at (18) whereby the fixed terminal indicates that it has a line free. That response contains an identification of the channel assigned to the handset.

The connection between the handset and the terminal is then established at (19) and the terminal transmits to the handset the signal tone to be dialed.

The owner of the handset then composes at (20) the number of his correspondent, which the fixed terminal (1) transmits to the exchange (3) by means of the telephone line (2) corresponding to the channel assigned to the handset. The call is then put through at (21) and the exchange of bundle of pulses continues, as indicated above, until the end of transmission at (22).

In the course of the call, the handset detects, among the management pulses, those corresponding to a memory card debit request. On their reception, the circuits of the handset debit a charge unit on the card and address a pay signal to the fixed terminal in the following bundle of pulses. In the absence of that signal, the fixed terminal cuts off the call.

The fixed terminal (1) will now be described with reference to FIGS. 3 and 4.

Figure 3:
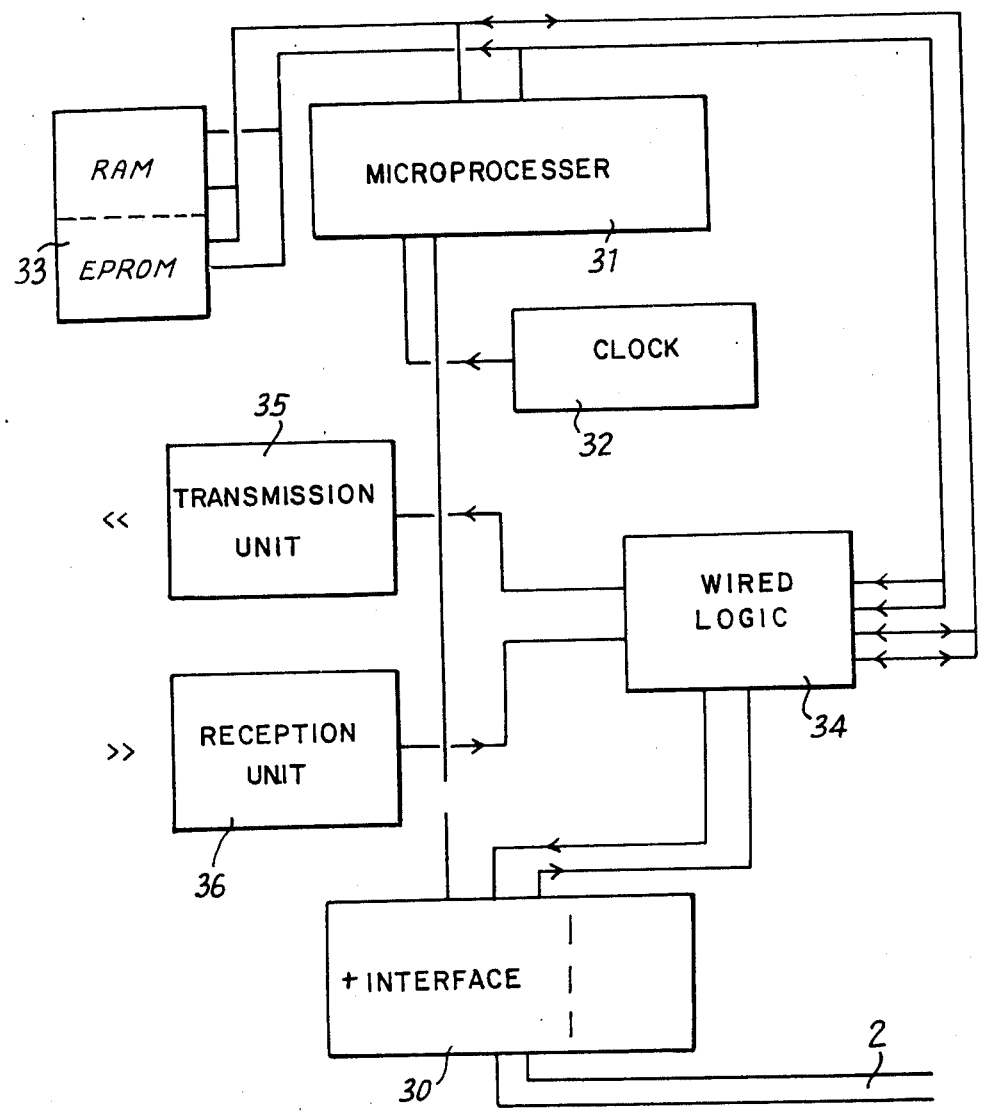
FIG. 3 is a block diagram of a fixed terminal according to the invention.

As shown on FIG. 3, that terminal contains an interface (3) with the lines (2).

It is at that interface (30) that the charging signals coming from the exchange (3) by means of the lines (2) are detected.

The interface (30) is managed by a microprocessor (31) operated by a clock (32). The microprocessor (31) assures, notably, management of the charging information coming from the interface (30), so as to code them and guarantee their transmission to the different handsets using the fixed terminal. The microprocessor (31) is also set up to verify the reception of the pay signals coming from the handsets and to cut off the call in the absence of those signals.

The fixed terminal also holds memories (33) containing the different data necessary for operation of the microprocessor.

A wired logical circuit (34), which will be described more in detail below, is controlled by the microprocessor (1) and assures transfer of the information to a transmission unit (35) and from a reception unit (36).

The transmission unit (35) assures control of the infrared photo-emitting diodes mentioned above, while the receiving unit (36) serves as interface between the photoreceptors of the optical unit and the wired logic (34).

As represented on FIG. 4, a channel of that wired logic essentially comprises a reception shifting register (40) and a transmission shifting register (41). Register (4) is connected to the sequential redundancy unit (42) making it possible to distinguish, on reception, the sound data pulses corresponding to the three previous samplings.

The pulses emanating from the reception unit (36) are transmitted to the reception register (40) by means of a reception channel validating logical circuit (43).

Upon the reception of a bundle of pulses by the reception unit (36) and validation of the channel by the logic (43), the synchronizing pulse of that bundle produces the activation of a trigger circuit (41) which starts off the reception cadence clock (45), so as to fill the shifting register (40) with the different values of the following pulses. The clock pulses are counted in a counter (46) equipped with a decoding circuit. A synchronizing logic (47) connected to the decoding counter (46) thus makes it possible to hold the end-of-bundle pulse in order to stop the reception clock (45) with the trigger circuit (44) and to prepare the start of a transmission clock (48).

The data information which is in the shifting register (40) is transmitted to the sequential redundancy processing unit (42) controlled by a logic (49). That unit (42) makes it possible to remove any doubt about the value of the datum to be transferred to the digital/analog converter (5) and from that converter to the interface (30). On the other hand, the management information contained in the shifting register (40) is transmitted to the microprocessor (31) by means of the bus (51).

Upon the occurrence of the end-of-transmission signal delivered by the synchronizing logic (47), the transmission shifting register (41) is loaded, on the one hand, for the sound data information, from a storage buffer (52) connected to the interface (30) by means of an analog/digital converter (53) and, on the other, for the management information, from a bus (54) connected to the microprocessor. The beginning- and end-of-bundle synchronizing pulses are introduced in the register (41) by forcing. The transmission clock (48) is then started off by a trigger circuit (55) and cadences the transmission of data coming out of the shifting register (41) to the transmission unit (35).

A counter (56) equipped with a decoder makes it possible to stop the transmission clock on the detection of the end-of-bundle pulse. It is to be noted, finally, that, as on reception, the transmission shifting register (41) is connected to the transmission unit (35) by means of a transmission validating logic (57).

The general arrangement of a handset (6) will now be described with reference to FIG. 5.

That figure represents at (6) the microprocessor of the handset controlled by a clock (61) and connected to a memory (62) containing the data necessary for its operation.

The microprocessor is also connected to the keyboard (63) of the handset and to its display screen (64).

As with the fixed terminal, a transmission unit (65) and a reception unit (66) are connected to a wired logic (67) receiving information, on the one hand, from the microprocessor (60) and, on the other, from an interface (68) with the microphone and the speaker of the handset.

Finally, the microprocessor (60) is connected to an interface circuit (69) with the memory card, so as to debit the latter with successive charge units upon the reception of charging information by means of the reception unit (66) and the wired logic (67).

The logical circuit (67) is identical to the logical circuit of a channel of the fixed terminal, as described with reference to Figure 4, except for the absence of the validating units (43) and (57).

Provision is further made for the possibility of the possessor of a portable handset being called through a predetermined fixed terminal.

For that purpose, he is stationed in proximity to that terminal and through a suitable control places his handset in a standby position in which the reception circuits are supplied. The correspondent dials the line number of the fixed terminal. The latter lifts the receiver and transmits over the line a signal to dial a complementary code characteristic of the handset of his correspondent. That code can, for example, be two-digit, the likelihood of being confronted by two portable handsets assigned the same number thus being sufficiently slight. The fixed terminal then emits a bundle of line signals, notably, containing that code, which has the effect of letting a sound signal be emitted by the handset concerned. The possessor of that handset then puts his set in on position in order to take the call.

Different variants and modifications can, of course, be introduced in the specification without thereby departing from the scope nor from the spirit of the invention.

I claim:

1. A telephone communications system comprising at least one fixed terminal connected by at least one subscriber's line to a telephone exchange and a plurality of portable handsets, said fixed terminal and said portable handsets having infrared transmitting means for exchanging unit charging information and sound data information, said fixed terminal comprising means for transmitting to a given handset unit charging signals received from said telephone exchange during a call, each portable handset comprising means for accommodating a support of a programmable read-only memory and means for deducting from said programmable read-only memory unit charges corresponding to said unit charging signals transmitted by said terminal, said portable handset further comprising means for transmitting a pay signal to the fixed terminal after having deducted said unit charge fee from said programmable read-only memory, and said fixed terminal further comprising means for cutting off the call in case of failure to receive a pay signal after having transmitted a unit charging signal.

2. A telephone communication system comprising at least one fixed terminal connected by a plurality of subscribers' lines to a telephone exchange and a plurality of portable handsets, said fixed terminal and said portable handsets having infrared transmitting means for exchanging charging data information and sound data information, said fixed terminal comprising means for transmitting to a given handset charging signals received from said telephone exchange during a call, each portable handset comprising means for accommodating a support of a programmable read-only memory and means for deducting from said programmable read-only memory unit charges corresponding to said charging signals transmitted by said fixed terminal, said fixed terminal comprising means to exchange said charging information and said sound data information with a plurality of portable handsets by time multiplexing of bursts of pulses emitted by infrared diodes, said fixed terminal and said portable handsets further comprising control means for controlling said infrared diodes.

3. A telephone communication system comprising at least one fixed terminal connected by at least one subscriber's line to a telephone exchange and a plurality of portable handsets, said fixed terminal and said portable handsets having infrared transmitting means for exchanging charging information and sound data information, said fixed terminal comprising means for transmitting to a given handset charging signals received from said telephone exchange during a call, each portable handset comprising means for accommodating a support of a programmable read-only memory and means for deducting from said programmable read-only memory unit charges corresponding to said charging signals transmitted by said fixed terminal, each portable handset having memory means for memorizing a code assigned thereto, said fixed terminal comprising means for receiving on said subscriber's line a call containing such a code and to emit a burst of pulses containing the code received with said call, and each handset comprising means for emitting a signal in response to the reception of a burst of pulses containing its own code thereby being connected with said subscriber's lines through said fixed terminal.

4. Telephone communication system according to claim 2, characterized in that each bundle of pulses includes pulses corresponding to a multiplicity of samplings preceding its emission, and the fixed terminal and the portable handsets contain means of combinational logic for determining, from the pulses of a multiplicity of successive pulse bundles, the information most probably transmitted.

5. Communication system according to claim 4, characterized in that each bundle of pulses contains pulses identifying the portable handset to which it is addressed or from which said bundle of pulses originates.

* * * * *